FIP8009 OR AI 100
M. Burnett
Horseshoe-Nail Machine
A I No. 100.
A. I. Apr. 13. 1852.
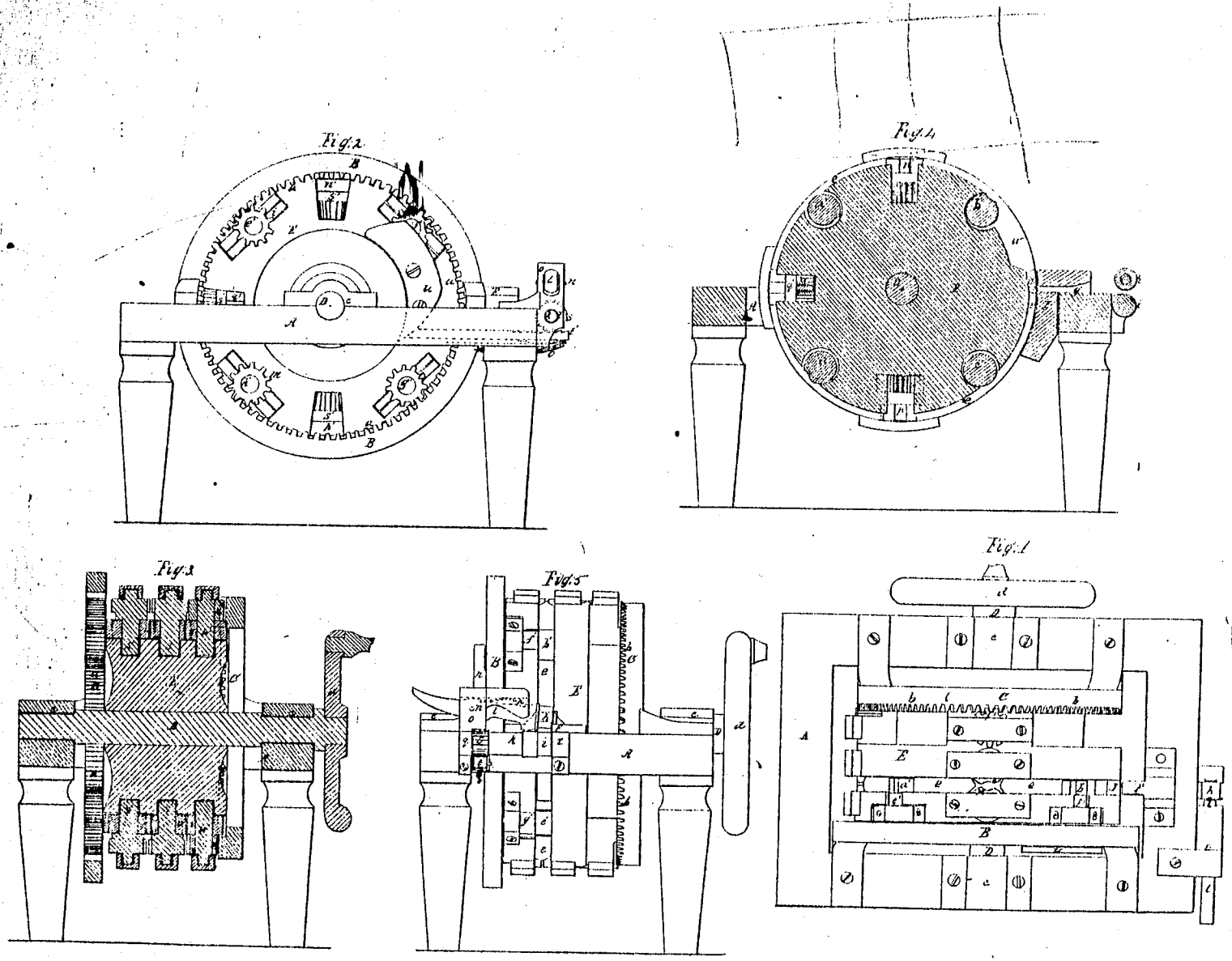
N. PETERS, PHOTO-LITHOGRAPHER, WASHINGTON, D. C.